June 2, 1970  A. MILO  3,515,157

FROST HEAVE-PROTECTED SHUT-OFF VALVE

Filed Oct. 8, 1968  3 Sheets-Sheet 1

INVENTOR.
AUGUST MILO
BY Peter J. Saylor
ATTORNEY

June 2, 1970  A. MILO  3,515,157

FROST HEAVE-PROTECTED SHUT-OFF VALVE

Filed Oct. 8, 1968  3 Sheets-Sheet 2

INVENTOR.
AUGUST MILO
BY
Peter J. Gaylor
ATTORNEY

June 2, 1970  A. MILO  3,515,157

FROST HEAVE-PROTECTED SHUT-OFF VALVE

Filed Oct. 8, 1968  3 Sheets-Sheet 3

INVENTOR.
AUGUST MILO
BY Peter J. Gaylor
ATTORNEY

United States Patent Office 3,515,157
Patented June 2, 1970

---

3,515,157
FROST HEAVE-PROTECTED SHUT-OFF VALVE
August Milo, 1015 Schliefer Drive,
Hillside, N.J. 07205
Filed Oct. 8, 1968, Ser. No. 765,809
Int. Cl. F16l *27/12;* F16k *17/36*
U.S. Cl. 137—68                    2 Claims

ABSTRACT OF THE DISCLOSURE

A shut-off valve having a shearable bonnet nipple, and over which a sealing sleeve is mounted by means of a lower union member, is made safe against leakage by frost heaving by providing a circumferential groove over which the union member is slipped. Thereafter, a ring is slipped over the nipple end and set in the groove. The flange of the union member is provided with a beveled edge which bears against the ring when the union member is tightened, whereby the union member is prevented from slipping off the nipple end when a frost heave takes place.

BACKGROUND OF THE INVENTION

The present invention relates to a shut-off valve which will not only close on heavy impact, as well as in case of fire, but will also provide safety against slippage of the valve bonnet nipple out of its sealing sleeve in the event of a frost heave.

A number of shut-off valves are now available on the market. These have bonnet nipples provided with shear grooves and connections for fusible links in the event of fire. In the event of a frost heave, one type depends on the shearing groove on the bonnet nipple to close the valve. This, of course, necessitates the replacement of a new bonnet for the valve whenever a severe frost occurs, and entails considerable loss of time for use of the equipment.

Another type of valve is provided with a smooth nipple on the valve bonnet. A sealing sleeve mounted over the nipple enables the latter to slide into or out of the sleeve during a frost heave. Unfortunately, there have been cases where the nipple slipped completely out of the bottom of the sleeve, whereby continual leakage of fuel occurred due to the discharge of the pump in order to maintain fuel pressure in its discharge line.

SUMMARY OF THE INVENTION

According to the present invention, the valve bonnet nipple fitting into the sealing sleeve is provided with a groove into which is slipped a split ring (after the lower union portion of the sleeve has been slipped over the nipple). The flange of the lower union portion of the sleeve is provided with a beveled edge which presses the ring inwardly when the union is tightened, whereby the lower union portion of the sleeve is stopped from slipping further, thus avoiding its slipping off the end of the bonnet nipple and causing a serious leakage of fluid. The movement caused by the frost heave is thus taken up by the sleeve's movement of its upper union member over the pipe leading to the dispensing pedestal, for example.

BRIEF DESCRIPTION OF THE DRAWINGS

The present invention will be more readily understood by reference to the accompanying drawings, in which a preferred embodiment is described, and in which.

The same numerals refer to similar parts in the various figures.

DESCRIPTION OF THE PREFERRED EMBODIMENTS

Figure 1:
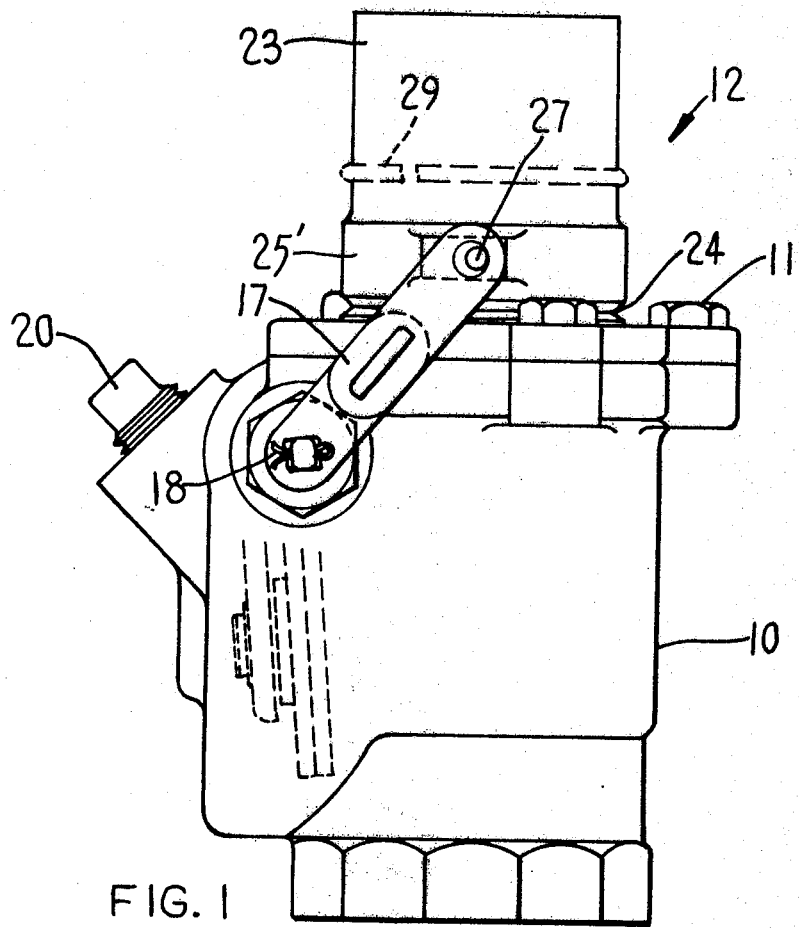
FIG. 1 presents a side elevational view of a valve of the present invention showing how the locking ring is applied, and without the sealing sleeve.
Figure 2:
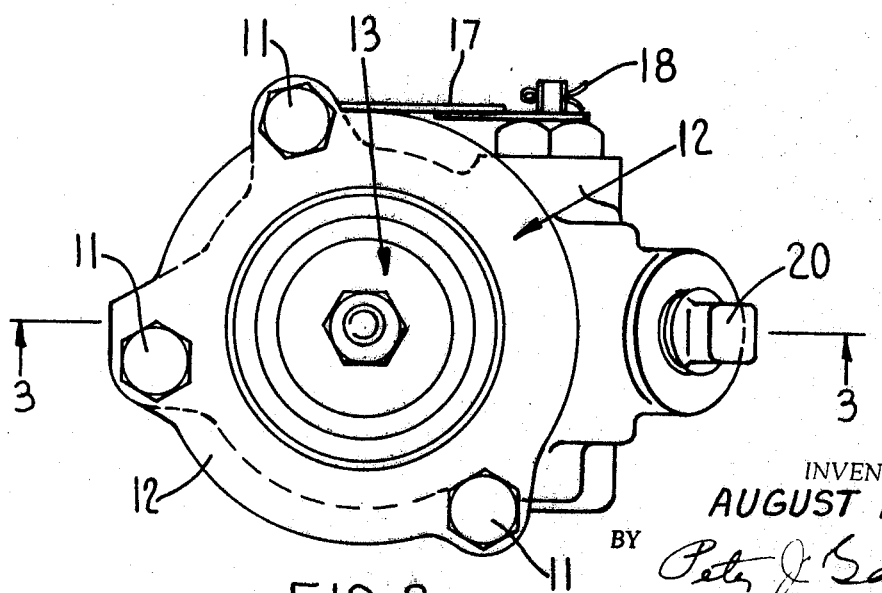
FIG. 2 depicts a top or plan view of the valve shown in FIG. 1.

Referring to the drawings, numeral 10 represents the lower body portion of the valve, to the upper part of which is attached, by means of bolts 11, the upper bonnet or adapter portion 12; lower body portion 10 is that of a conventional shut-off valve having a flap valve, indicated general as 13, attached at its bottom to the end of lever 14, the latter being spring-loaded by means of spiral spring 15. The other end of lever 14 and spring 15 are mounted on pivot pin 16. The end of pin 16 projects outside of the body and it serves as an engaging means for the end of fusible link 17. A cotter pin 18 inserted in the projecting end of pin 16 serves to prevent linq 17 from slipping off. The bottom inlet portion 18 of body 10 is provided with inner threads 19 for connection to the end of a pipe leading to the pump discharge within the fuel tank (not shown). Also, valve body 10 is provided with a removable plug 20, which may be replaced with a gage for testing the pump pressure.

Figure 3:
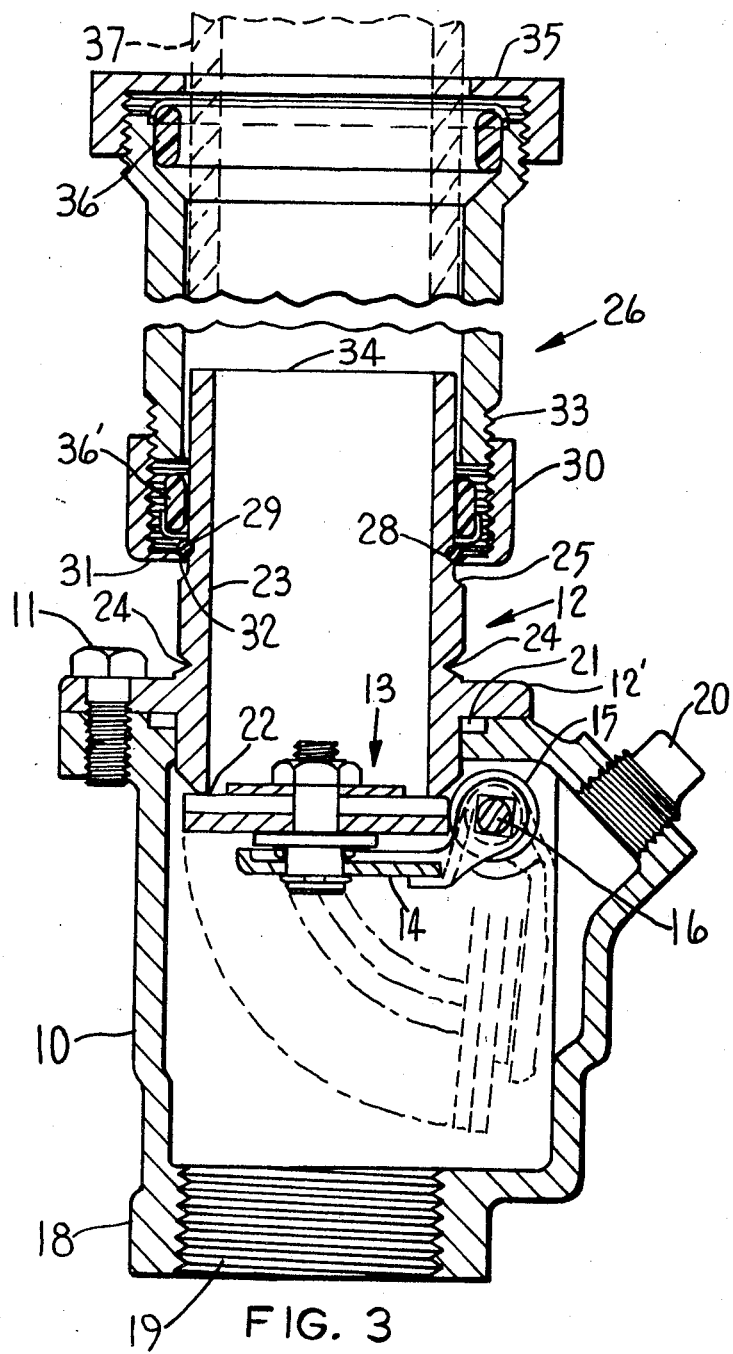
FIG. 3 illustrates a cross-sectional side view taken along the plane of line 3—3 in FIG. 2, with a cross-sectional view of the slideable sealing sleeve also shown, and with the valve flap in open position indicated in broken lines.
Figure 5:
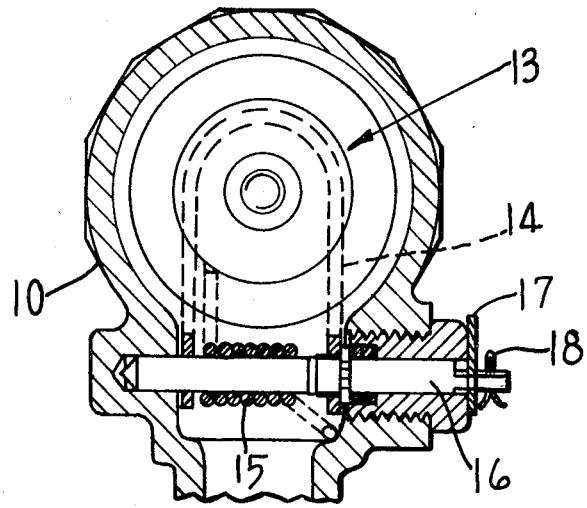
FIG. 5 presents a cross-sectional top view taken along the plane of line 5—5 in FIG. 4, but with the plug portion cut away.
Figure 4:
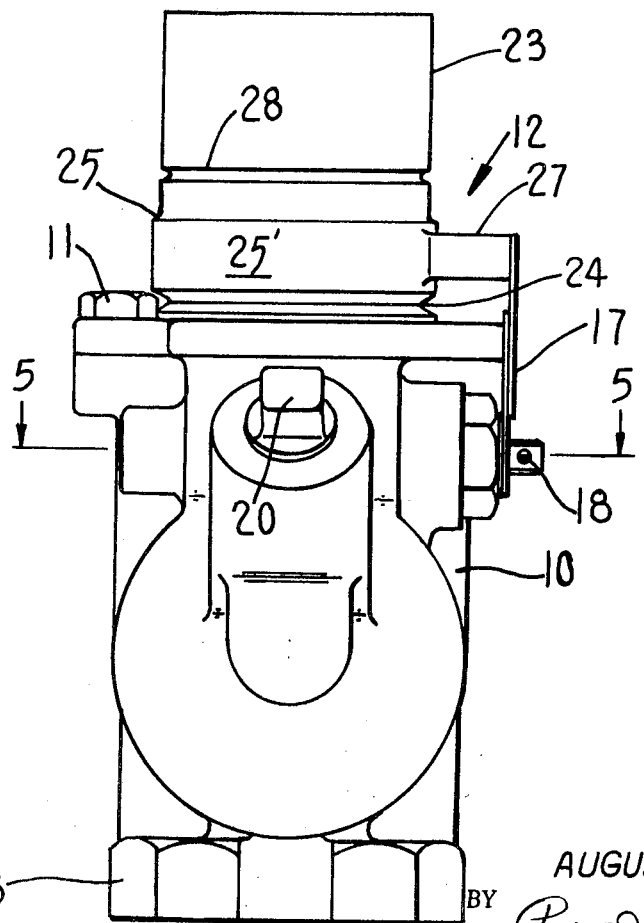
FIG. 4 depicts a front elevational view of the valve shown in FIGS. 1 and 2, but with the locking ring removed.

The bonnet adapter, indicated generally as 12, is attached at its bonnet portion 12' to body 10 by bolts 11, and sealing from the outside is accomplished by gasket 21. The lower end 22 of the bonnet nipple 23 protruding into body 10 serves as a sealing edge against valve flap 13, when the flap is in closed position, as in FIG. 3. Nipple 23 also has an outer circumferential groove 24, at which location the nipple would be sheared in the event of heavy impact upon the valve, such as if it were run into by a truck, or the like. A shoulder 25 is also provided above groove 24 to serve as a stop for the sealing sleeve, indicated generally as 26. On widened shoulder source 25' is attached a pin 27 onto which is attached (against the force of spring 15) the other end of fusible link 17. It will be noted that, in the event of a fire, fusible link 17 would melt, causing spring 15 to snap flap 13 into valve-closing position. Also, in the event of severance of nipple at shear groove 2, link 17 would be disengaged, so that valve flap 13 would also be snapped into closed position.

Above shoulder 25, nipple 23 is provided with a circumferential groove 28 which is not as deep as groove 24, so as not to impede the latter's purpose of shearing on impact. Groove 28 is intended to serve as anchoring means for split ring 29 which projects beyond the outer peripheral surface of nipple 23. The bottom union portion 30 has a flange 31 with a beveled edge 32. The purpose of this bevel is to apply inward pressure upon ring 28 when the union portion 30 is screwed onto the threads 33 of sleeve 26. This causes the ring to serve as a stop for union portion 30, and prevents the latter from sliding past the terminal edge 34 of nipple 23 in the event of a freeze heave due to winter conditions, for example.

Sleeve 26 is provided with a sealing union portion at its upper end, which comprises a flange 35 that presses upon gasket 36, the latter serving as an outer seal against pipe 37, which latter would lead to the dispensing pedestal, for example.

It is thus seen that, in the event of a frost heave, sleeve 26 will slip over pipe 37, the end of which will have adequate length (depending, of course, upon the length of sleeve 26), before it could slip out of the sleeve, and there would be no possibility of end 34 of nipple 23 from slipping out of sleeve 26. Sleeve 26 may be of different length, depending on the temperature zone of the particular location. The gaskets 36–36', shown in FIG. 3, have not been screwed on tightly. However, when in use, gaskets 36–36' are screwed on tightly to effect outside sealing, although their flexibility will still allow nipple 23 to slide into the sleeve in the event of frost heaves, and no leakage will occur.

I claim:

1. A frost heave-protected shut-off valve, of the type described, comprising:
   a lower body portion having a lower fluid inlet means,
   a spring-loaded valve flap mounted on a lever and a pivot pin mounting said leave extending out of said body,
   a fusible link having one end affixed to said pin extension,
   a bonnet attached in outside-sealing relation to said body and having a downwardly projecting nipple end serving as the valve flap seating means, and having an upwardly-extending nipple portion provided with a shear groove and means for holding the other end of said link against spring pressure,
   a narrow circumferential groove disposed in said upward nipple portion above said shear groove and link-holding means,
   a retaining ring disposed in said narrow groove,
   a sealing sleeve having its upper end connectable in sliding sealing relation to a discharge pipe, and mounted over said upward nipple portion and having a threaded sealing union member at its lower end in sealing engagement with said nipple portion, said union member having a flange circumscribing said upward nipple portion below said narrow groove, and
   an inner beveled edge on said union flange designed to impress inward pressure upon said ring when said union member engages said ring to serve as a stop, whereby movement of said flange past said ring is prevented in the event of a frost heave.

2. A shut-off valve, according to claim 1, in which said upward nipple is widened above said shear groove, and said widened portion mounts the link-holding means, and also serves as a stop for the union flange.

References Cited

UNITED STATES PATENTS

| 358,074 | 2/1887 | Ryan | 285—302 |
| 1,363,974 | 12/1920 | Heylman | 285—302 |
| 2,965,116 | 121960 | Boone et al. | 137—68 X |
| 3,378,021 | 4/1968 | Milo | 137—68 |

WILLIAM F. O'DEA, Primary Examiner

R. GERARD, Assistant Examiner

U.S. Cl. X.R.

137—75; 251—150; 285—302